(12) United States Patent
Clegg et al.

(10) Patent No.: US 6,934,936 B2
(45) Date of Patent: Aug. 23, 2005

(54) APPARATUS AND METHOD FOR ADAPTIVE ADDRESS-BASED HISTORICAL UTILIZATION RECORDING

(75) Inventors: Jason Alan Clegg, Rochester, MN (US); Charles Scott Graham, Rochester, MN (US); Shawn Michael Lambeth, Rochester, MN (US); Gene Steven Van Grinsven, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 09/775,119

(22) Filed: Feb. 1, 2001

(65) Prior Publication Data
US 2002/0147944 A1 Oct. 10, 2002

(51) Int. Cl.[7] .................................................. G06F 9/44
(52) U.S. Cl. ........................ 717/127; 713/178; 714/25; 710/8; 710/9; 710/10; 718/102; 718/103; 718/104
(58) Field of Search ................................ 717/127, 161; 709/102–104; 718/102–104; 713/178; 714/25, 37–42; 710/8–10, 308

(56) References Cited

U.S. PATENT DOCUMENTS

| 4,636,967 A | * | 1/1987 | Bhatt et al. ..................... 377/16 |
| 5,361,362 A | * | 11/1994 | Benkeser et al. ........... 718/102 |
| 5,933,840 A | * | 8/1999 | Menon et al. ............... 707/206 |
| 6,023,736 A | * | 2/2000 | Lambeth et al. .............. 710/10 |
| 6,073,253 A | * | 6/2000 | Nordstrom et al. ........... 714/25 |
| 6,253,305 B1 | * | 6/2001 | Matsuzaki et al. ............ 712/32 |
| 6,507,592 B1 | * | 1/2003 | Hurvig et al. .............. 370/503 |

* cited by examiner

*Primary Examiner*—Anil Khatri
*Assistant Examiner*—Lawrence Shrader
(74) *Attorney, Agent, or Firm*—Moser, Patterson & Sheridan, LLP

(57) ABSTRACT

An apparatus and method for recording segment execution times in a processing system are provided. The method includes the steps of recording a timestamp corresponding to the beginning of a segment to be executed, wherein the recording step is conducted through a firmware operation. The method further includes the step of updating the timestamp with an elapsed segment execution time, wherein the updating step is conducted through a plurality of hardware based operations that are executed without firmware interaction.

23 Claims, 5 Drawing Sheets

APPARATUS AND METHOD FOR ADAPTIVE ADDRESS-BASED HISTORICAL UTILIZATION RECORDING

BACKGROUND OF THE INVENTION

1. Field of the Invention

The present invention generally relates to the field of computer systems, and more particularly, to an apparatus and method for accurately recording and regulating segment execution in processor architectures.

2. Background of the Related Art

Complex processor architectures are common elements in various computer systems such as input/output (I/O) systems, multiple function systems, and assorted subsystems thereof. These processor architectures generally include a primary central processing unit (CPU) 20, a memory controller 21, and a memory 22, as shown in FIG. 1. A processor bus 23 is generally used to interconnect CPU 20 and memory controller 21, a memory bus 24 is generally used to interconnect memory 22 and memory controller 21, and a system bus 25 is generally used to interconnect memory controller 21 to any additional devices in the architecture. In this configuration, memory controller 21 operates to regulate access to memory 22, both by CPU 20 and the additional devices in communication with the architecture via system bus 25. In regulating access to memory 22, memory controller 21 must also arbitrate between the devices requesting access to memory 22. Additionally, other base programming codes or software applications, often termed firmware, are used to execute the aforementioned regulation/arbitration functions, as well as to provide additional functionality. A building block of this firmware is an operating system, which is generally used to provide various CPU based functionality, depending upon the type of architecture, in addition to controlling access of segment execution to CPU 20 by additional firmware entities, wherein segment execution is generally defined as an instruction from a firmware entity to be executed by the processor. The operating system generally includes software-type instructions that may be stored in memory 22 that are generally executed in CPU 20.

As these complex processor architectures continue to develop, the need to accurately and efficiently measure and regulate firmware segment execution times within the processor architectures becomes critically important to effective operation of the architectures, as no single firmware entity should be allowed to monopolize execution time if the system as a whole is to cooperatively function in an efficient manner. To that end, various software based implementations for measuring and regulating segment execution times for processor architectures are currently available. These software based implementations generally calculate and update timestamps corresponding to the beginning and end of segment executions through the use of multiple software instructions executed by the operating system of the CPU. Thereafter, processor allocation to various firmware applications is regulated in accordance with the proportion of available processing time and the amount of segment processing time requested by the various firmware applications, such that over-utilization of a particular micro processor in a complex system by a single firmware entity can be avoided. As such, regulation of firmware allows for effective balancing and usage of the system processors from an overall system standpoint.

Although the various software based implementations are apparently able to calculate segment execution times in CPU 20 and regulate the subsequent processor allocation, the quantity of software instructions required by the software based processes themselves inherently results in a decreased efficiency of operation of the processing architecture as a whole. This is generally a result of the large quantity of firmware pathlength overhead necessary to record and regulate processor usage in a software based implementation, which itself contributes to the overhead usage and pathway congestion that the software is designed to reduce. In particular, current software based systems for monitoring and regulating CPU segment execution times utilize the CPU operating system to conduct the bulk of the monitoring and regulating operations. For example, current systems generally utilize the CPU operating system to execute a timestamp operation for monitoring segment execution times. In executing the timestamp operation through the CPU operating system, tens of clock cycles are often consumed, as the operating system must read a memory location having a start time value therein, add a delta time value to the start time value, and write the added value back out to a memory location.

Therefore, the software process itself contributes to the firmware pathlength overhead in the CPU operating system, as the operating system is tied up during the tens of clock cycles used for each timestamp operation corresponding to a segment execution. Taking into consideration that current processors may execute millions of segments per second, it follows that the current software based systems themselves substantially contribute to the overhead firmware pathlength that they are designed to minimize.

Therefore, there remains a need for a method and apparatus for monitoring and regulating segment execution times in a processing architecture, wherein the application itself does not significantly contribute to the firmware pathlength overhead of the CPU and/or operating system during operation.

SUMMARY OF THE INVENTION

The present invention generally provides a system and method for monitoring and regulating firmware segment execution in a complex processor architecture, wherein the method and system itself does not significantly contribute to the overhead firmware pathlength during operation.

In one embodiment of the present invention a method for recording segment execution times in a processing system is provided, wherein the method includes the step of recording a timestamp corresponding to the beginning of a segment to be executed. The recording step is generally conducted through a firmware operation. The method further includes the step of updating the timestamp with an elapsed segment execution time, wherein the updating step is generally conducted through a plurality of hardware based operations that are executed without firmware interaction.

In another embodiment of the present invention a method for recording segment execution times through a central processing unit is provided. The method includes the steps of writing a first determined memory address into a timestamp address register with a firmware based operation and reading contents of the first determined memory address into a location value register with a hardware based operation. An elapsed time value corresponding to a segment execution time is then added to the contents read into the location value register to create an updated value, wherein the adding step is generally conducted with a hardware based operation. Further the method includes the step of storing the updated value to the first determined memory address with a hardware based operation.

In yet another embodiment of the present invention an apparatus for recording segment execution times in a processing system is provided. The apparatus includes a memory controller in communication with a central processing unit and a memory. The memory controller includes at least one control register, at least one address register, and a timestamp assist logic module. The timestamp assist logic module is configured to conduct timestamp update operations autonomously from the central processing unit.

In another embodiment of the present invention a memory controller for recording segment execution times in a complex processor system is provided. The memory controller includes a timestamp assist logic module, a timestamp control module, and a timestamp address module. The memory controller is configured to communicate with a memory in order to execute a timestamp update operation corresponding to a particular segment execution time, wherein the timestamp update operation is conducted without interaction with an operating system of the complex processing system.

These and other features and objects of the invention will be apparent to those skilled in the art upon review of the following detailed description in conjunction with the accompanying drawings.

BRIEF DESCRIPTION OF THE DRAWINGS

So that the manner in which the above recited features can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides a system and method for monitoring and regulating firmware segment execution times in a complex processor architecture. However, unlike previous software based systems and methods, the present invention utilizes a predominantly hardware based configuration to monitor the segment execution times, which results in a substantially reduced firmware pathlength intrusiveness by the method and system itself. The hardware based mechanism, which may generally be provided in a microprocessor and/or a memory controller, is used to perform "timestamp" actions at selected points in the firmware execution sequence that represent the desired time differential to be monitored. As such, the hardware mechanism may conduct timestamp operations in a generally autonomous manner, as interaction with a central processor or operating system is not involved.

Figure 1:
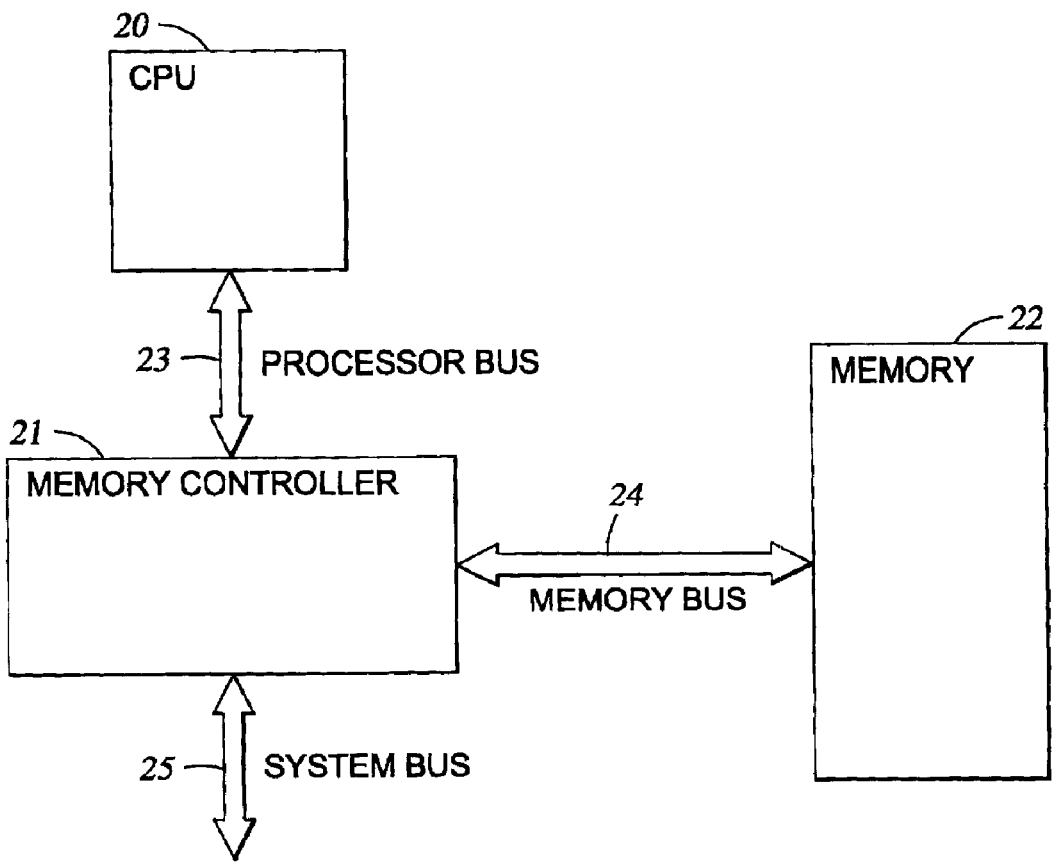
FIG. 1 illustrates an exemplary complex processing architecture.
Figure 2:
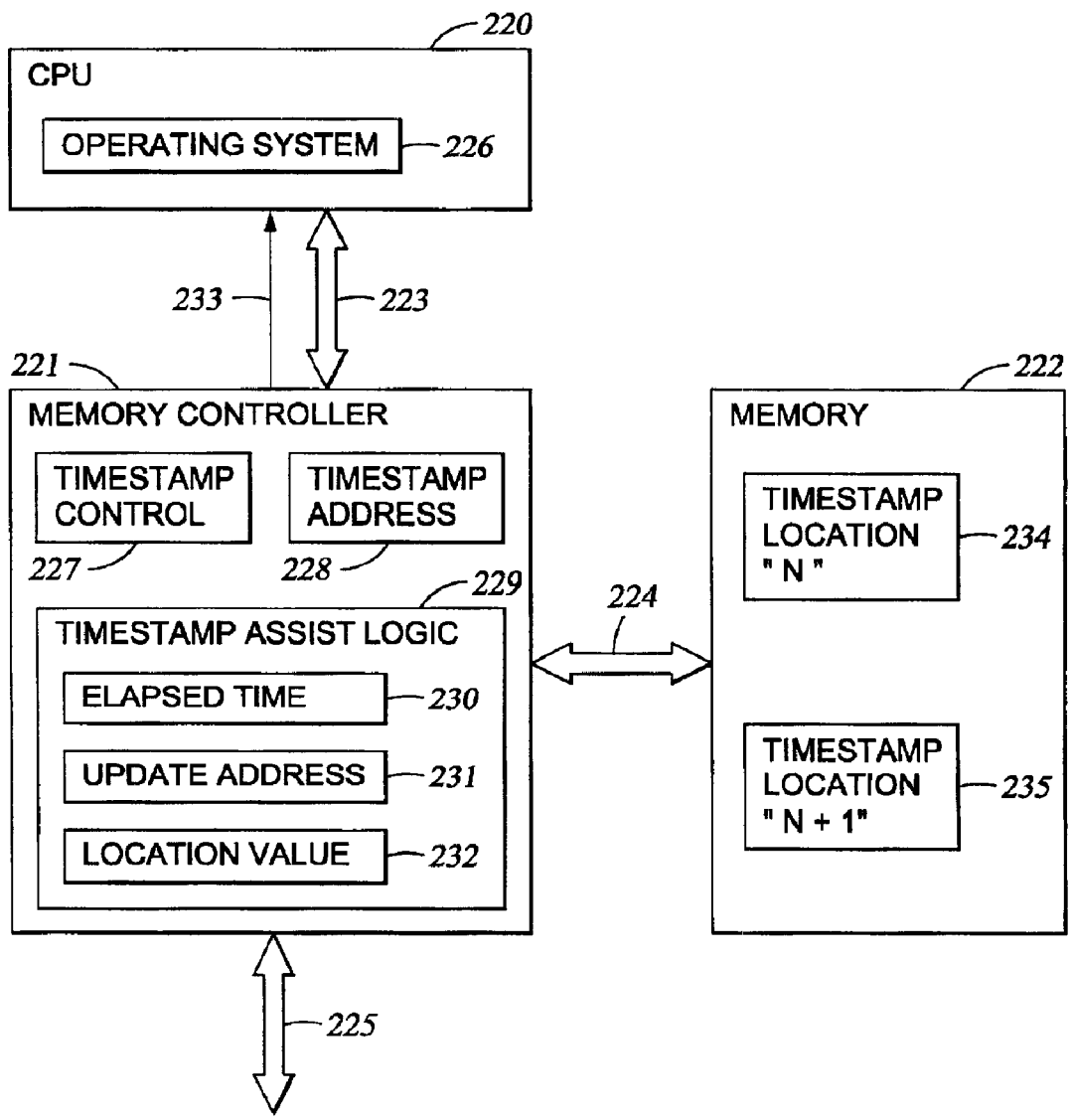
FIG. 2 illustrates an exemplary processing architecture of the present invention.

FIG. 2 illustrates an exemplary hardware configuration of an embodiment of the present invention. In the exemplary configuration, memory controller 221, which is embodied as a hardware component, includes a timestamp control register 227, a timestamp address register 228, and a timestamp assist logic module (TAL) 229. Registers 227 and 228 are generally globally accessible, as they are able to be read and/or written to by components outside of memory controller 221. TAL 229 includes an elapsed time device (ET) 230, an update address device (UA) 231, and a location value device (LV) 232 therein. Although each of ET 30, UA 31, and LV 232 may be physically embodied as registers within TAL 229, their operational characteristics are generally distinct from traditional registers, as each of ET 230, UA 231, and LV 232 are not registers that are generally accessible to operating system 226. Inasmuch as these registers are not accessed by operating system 226, the update timestamp operations conducted by these registers is not included in the overhead of operating system 226. Therefore, separation of ET 230, UA 231, and LV 232 from operating system 226 relieves substantial overhead from operating system 226 during timestamp operations, as will be discussed below.

Timestamp control register 227 operates to initialize and enable the functionality of the necessary hardware of the system, and timestamp address register 228 operates to store a memory location address to be used as a timestamp for following segment executions. ET 230, which may be a register or other suitable device, is generally configured to determine the time elapsed from the most recent address register update until an access into ET 230. As such, ET 230 may be in communication with a timer or counter (not shown) for the purpose of determining the above-mentioned elapsed time. UA 231 is generally configured to determine and/or store a memory location address indicating where TAL 229 is to read or write the next operation. Although UA 231 may be a register, other suitable devices for determining and/or storing memory address locations may be used in place of UA 231. LV 232 is generally configured to store the most recent timestamp value read from memory 222, or alternatively, an updated timestamp value to be used by TAL 229 or written to memory 222. The hardware combination of registers 227, 228 and the respective components of TAL 229 cooperatively operate with the software driven operating system 226 to monitor and record processor utilization in the present invention using substantially fewer clock cycles than software based systems, while also minimizing the pathlength overhead of operating system 226.

A predetermined number of memory locations, wherein the predetermined number is generally determined by an operating system, may be set aside within memory 222 for storing timestamp data representative of the processor utilization by various firmware applications. These memory locations, of which two examples are illustrated in FIG. 2 (timestamp location "N" 234 and timestamp location "N+1" 235) store the timestamp/execution time information relative to CPU 220 for further use. The information stored in memory locations 234, 235 is controlled by memory controller 221, and more particularly, by TAL 229. Although a predetermined number of locations are specified, the actual number of locations utilized is generally limited only by the physical number of locations available in memory.

Figure 3:
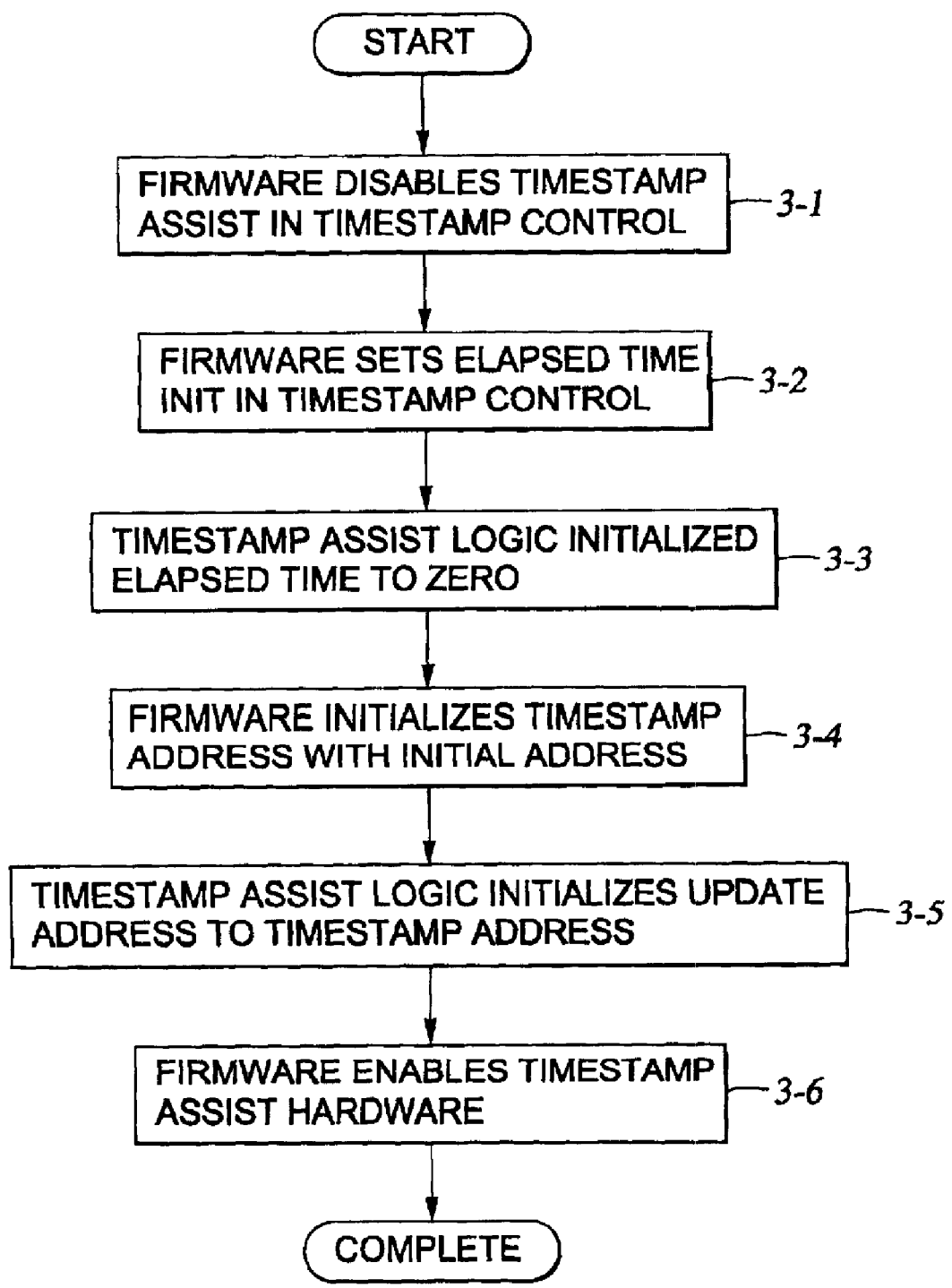
FIG. 3 illustrates a flowchart of an exemplary initialization and enablement process of the present invention.

Prior to operation, a startup sequence is generally executed in order to properly initialize the components of the system, as illustrated in FIG. 3. Initialization of the system begins at step 3-1, where a firmware entity, operating system 226 for example, disables the timestamp assist functions in the timestamp control register 227. This operates to place TAL 229 in a standby mode during the initialization process, so that no timestamp updates are incorrectly processed prior to completion of initialization. Thereafter, at step 3-2 firmware/operating system 226 initiates an elapsed time initialize function in timestamp control register 227. In response to the initialization of the elapsed time initialize function, ET 230 is reset to an initial value, which is generally zero, at step 3-3 by TAL 229. At step 3-4 operating system 226 initializes timestamp address register 228 with a predetermined address, which will be represented by "N". At step 3-5 TAL 229 initializes UA 231 with the value of timestamp address register 228. At step 3-6 operating system 226 re-enables TAL 229 and its associated hardware through asserting a functionality enable bit in timestamp control register 227, and thereafter, the initialization process is complete.

Figure 4:
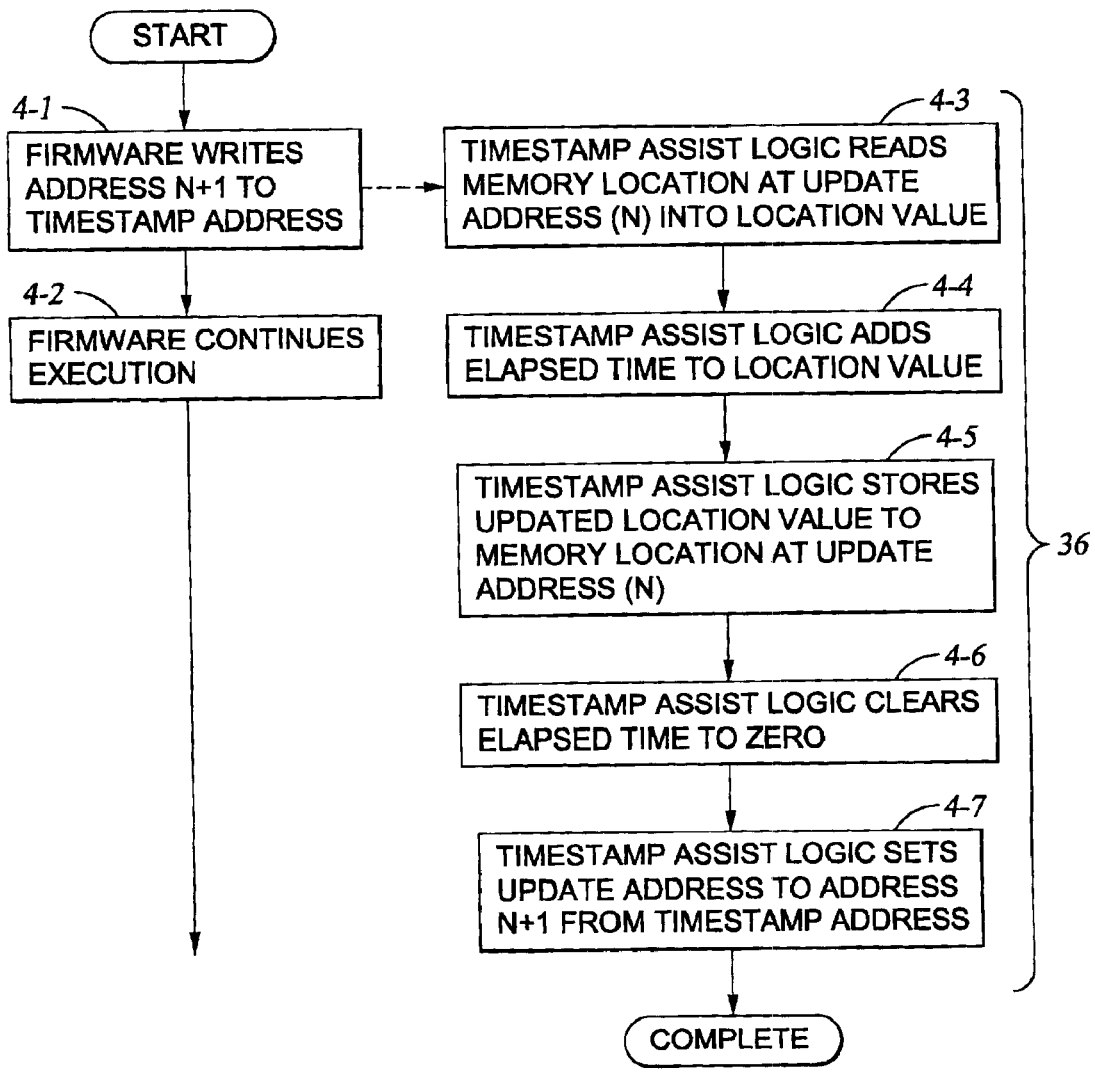
FIG. 4 illustrates a flowchart of an exemplary segment timestamp operation of the present invention.

Once the initialization sequence is complete, operating system 226 begins the processor monitoring operations, as shown in FIG. 4. In particular, upon beginning to execute a segment from a firmware entity, firmware/operating system 226 of the present invention, in conjunction with memory controller 221, writes a first address "N+1" into timestamp address register 228 at step 4-1. Thereafter, the firmware portion of the present invention, which is defined as operations necessitating involvement of operating system 226, is complete, and the firmware continues normal segment execution at step 4-2. However, simultaneously with the continued execution of segments at step 4-2 by operating system 226, the hardware portion 36 of the present invention continues with the operations necessary to monitor and regulate segment execution at step 4-3. It should be noted, however, that during step 4-3 and all following steps, the firmware portion of the invention, e.g., operating system 226, is not involved. Therefore, CPU 220 and operating system 226 are able to continue processing firmware segments from various entities without expending overhead processing segments related to the monitoring and regulation of segment processing resources. Rather, hardware portion 36 of the present invention removes these tasks from CPU 220 and operating system 226 through the steps beginning with step 4-3 and continuing through step 4-7.

During step 4-3 TAL 229, which is a hardware component in memory controller 221 capable of operating without instruction from operating system 226 after initialization, e.g. autonomously from operating system 226, reads memory location 234 designated by UA 231 and writes this value into LV 232. Thereafter, at step 4-4 TAL 229 adds the value of elapsed time stored in ET 230 to the value written into LV 232 during step 4-3. After executing the addition operation of step 4-4, TAL 229 stores the value present in LV 232 back to the memory location designated by UA 231 at step 4-5. This value represents the segment execution time of the segment currently being processed, and therefore, TAL 229 resets the value in ET 230 to zero at step 4-6 so that the elapsed execution time for the next segment can be determined. In order to complete the timestamp operations conducted by hardware portion 36, TAL 229 sets UA 231 to the address corresponding to memory timestamp location "N+1" 235, which is obtained from timestamp address register 228. This step equates to moving the value stored in timestamp address register 228 into UA 231. At this point the system is ready to determine the segment execution time for the next segment encountered by CPU 220.

Figure 5:
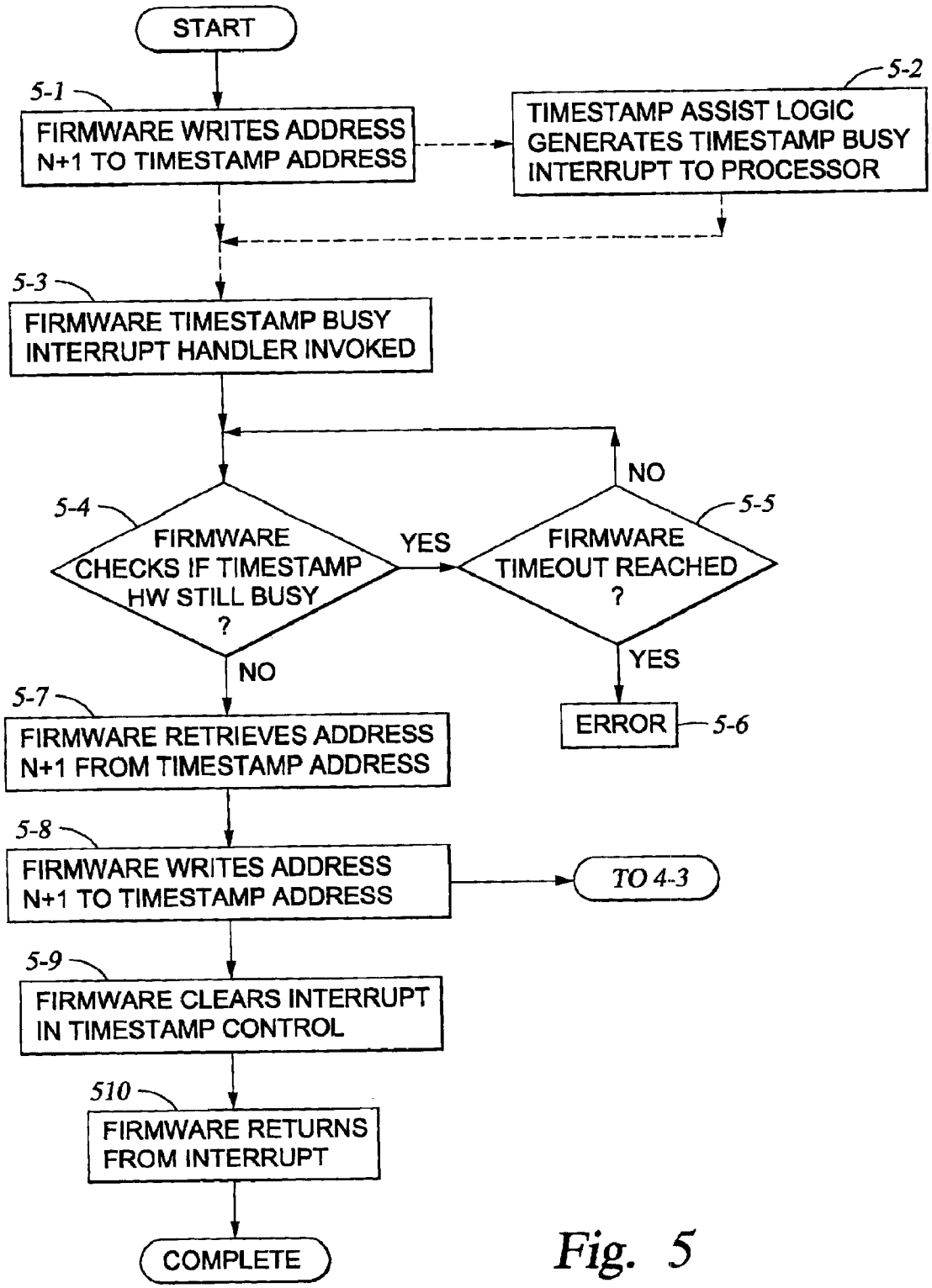
FIG. 5 illustrates a flowchart of an exemplary interrupt handler operation.

Upon completion of step 4-7, processes for determining and recording an execution time for a single segment are concluded. However, if another segment is received and/or processed by operating system 226 before completion of the steps necessary to record the segment execution time for the first segment, then the logic continues as illustrated in FIG. 5. Upon receiving a second segment for execution, the firmware of the present invention writes address location "N+1" 230 into timestamp address register 228, as shown in step 5-1. At step 5-2 TAL 229 generates a timestamp busy interrupt signal 233 that is sent to operating system 226 via processor bus 223. Upon recognition of interrupt signal 233, operating system 226 invokes a timestamp busy interrupt handler at step 5-3. Upon invoking the interrupt handler, operating system 226 determines if hardware 36 for the timestamp operations is still busy at step 5-4 through review of timestamp control register 227, which generally contains a bit or bits indicative of the hardware status. If it is determined that hardware 36 is still busy at step 5-4, then operating system 226 determines if a predetermined timeout period has expired at step 5-5. If the predetermined timeout period is determined not to have expired at step 5-5, then the logic returns to step 5-4 and again determines if hardware 36 is still busy. This loop through step 5-4 and step 5-5 may be terminated after either a predetermined amount of time, or alternatively, after a predetermined number of loop cycles, or through another known loop termination technique.

However, if it is determined that a firmware timeout has been reached at step 5-5, then an error is determined at step 5-6, as hardware 36 is still busy and the timeout parameter has been satisfied. If hardware 36 is determined not to be busy at step 5-4, either originally or in one of the loop cycles through steps 5-4 and 5-5, then operating system 226 retrieves timestamp address "N+1" from timestamp address register 228 at step 5-7. Thereafter, operating system 226 writes address "N+1" into timestamp address register 228 at step 5-8. Upon completion of step 5-8, hardware 36 has essentially been reset and/or cleared from the interrupt state caused by receiving a second segment prior to fully processing a first segment. Although this condition is unlikely, it provides an embodiment for handling interrupts. As such, upon handling the interrupt, the present invention returns to step 4-3 for processing of the second segment by hardware 36. Furthermore, simultaneously with the progression/return of the present invention to step 4-3, the interrupt handling logic continues to step 5-9 where operating system 226 clears the interrupt bit or bits in timestamp control register 227. Upon physically clearing interrupt 233 from timestamp control register 227, operating system 226 returns to normal operation from the interrupt handler state at step 5-10.

An alternative to the operation for handling multiple simultaneous segments illustrated in FIG. 5 is to have memory controller 221 block upon executing a new write of timestamp assist address register until the timestamp assist logic is no longer busy. A method for handling multiple segments using the memory controller block technique, although effective in preventing processing errors resulting from multiple segments, nonetheless suffers from the disadvantage of essentially stalling the processor during the block operation. Therefore, although blocking is an effective technique, the segment handling technique illustrated in FIG. 5 is preferred in the present invention.

Although the foregoing is directed to preferred and/or exemplary embodiments of the present invention, additional embodiments of the invention may be devised without departing from the scope thereof, wherein the scope of the present invention is determined by the metes and bound of the following claims.

What is claimed is:

1. A method for recording segment execution times in a processing system, the method comprising the steps of:

writing an address of a memory location for storing a timestamp corresponding to the beginning of a segment to be executed, the writing step being conducted through a firmware operation; and updating the contents of the memory location with an elapsed segment execution time, the updating step being conducted through a plurality of hardware based operations autonomously, without firmware interaction.

2. The method of claim 1, wherein the writing step comprises writing a first memory address into a globally accessible timestamp address register.

3. The method of claim 1, wherein the updating step comprises: reading the contents of a second memory location designated by an update address register;

writing the contents of the second memory location into a location value register;

adding the elapsed segment execution time to the location value register contents; and storing the location value register contents to the second memory location indicated by the update address register.

4. The method of claim 3 further comprising the steps of:

clearing the elapsed segment execution time stored in an elapsed time register; and setting a second value in the update address register with a first value from a timestamp address register.

5. The method of claim 1, further comprising the step of initializing hardware components of the processing system, the initializing step further comprising the steps of:

disabling timestamp assist functions;

setting an elapsed lime register to an initial value;

writing an initial address into a timestamp address register;

writing the initial address to an update address register; and enabling the timestamp assist functions.

6. The method of claim 1 further comprising the step of invoking an interrupt handler if a second segment is received for processing during the updating step.

7. The method of claim 6, wherein the step of invoking an interrupt handler further comprises:

generating an interrupt signal in a memory controller;

determining if the updating step is still in process;

determining if a timeout has been reached if the updating step is determined to still be in process;

restarting the updating step for the second segment; and clearing the interrupt signal from the memory controller.

8. A method for recording segment execution times through a central processing unit, the method comprising the steps of:

writing a first determined memory address into a timestamp address register with a firmware based operation;

reading contents of the first determined memory address into a location value register with a hardware based operation;

adding an elapsed time value corresponding to a segment execution time to the contents read into the location value register to create an updated value, the adding step being conducted with a hardware based operation autonomously, without firmware interaction; and storing the updated value to the first determined memory address with a hardware based operation.

9. The method of claim 8, wherein the reading step comprises:

reading a memory location from an update address register in a timestamp assist logic module; and writing the memory location into the location value register in the timestamp assist logic module.

10. The method of claim 8, wherein the adding step comprises:

reading the elapsed time value from an elapsed time register in a timestamp assist logic module, the elapsed time value corresponding to an elapsed time between a start of a segment execution and the step of reading the elapsed time; and adding the elapsed time value to the contents stored in the location value register.

11. The method of claim 8, wherein the storing step comprises:

reading the contents of a location value register; and writing the contents read from the location value register to the first determined.

12. The method of claim 8 further comprising the steps of:

generating a segment processing interrupt when a second segment is received for processing during one of the wilting, reading, adding, and storing steps;

transmitting the segment processing interrupt to a processor;

interrupting segment processing; and invoking a timestamp busy interrupt handler.

13. The method of claim 12, wherein invoking the timestamp busy interrupt handler comprises:

determining if the updating step is still in process;

determining if a timeout has been reached if the updating step is determined to still be in process;

restarting the updating step for the second segment; and cleaning the interrupt signal from the memory controller.

14. An apparatus for recording segment execution times in a processing system, the apparatus comprising a memory controller in communication with a central processing unit and a memory, the memory controller comprising:

at least one control register;

at least one address register; and a timestamp assist logic module configured to conduct timestamp update operations autonomously from the central processing unit by automatically updating contents of a memory location specified by a value in the address register without interaction with the central processing unit.

15. The apparatus of claim 14, wherein the timestamp assist logic module comprises:

an elapsed time module;

an update address register; and a location value register.

16. The apparatus of claim 15, wherein the elapsed time module comprises an elapsed time register having an updated elapsed time value stored therein.

17. The apparatus of claim 14 further comprising:

a processor bus in communication with the central processing unit and the memory controller for communication therebetween;

a memory bus in communication with the memory and the memory controller for communication between the memory controller and a plurality of memory locations in the memory; and a system bus in communication with the memory controller, the system bus being configured to connect one or more additional devices to the memory controller.

18. The apparatus of claim 14, wherein the control register is configured to generate an interrupt signal when the timestamp assist module receives a second segment for processing while a first segment is currently processing, the interrupt signal being transmitted to the central processing unit via a system bus.

19. A memory controller for recording segment execution times in a complex processor system, the memory controller comprising:

at least one address register accessible to an operating system running on the complex processing system; and a timestamp assist logic module is configured to road from and write to a memory location specified by a value stored in the address register by the operating system in order to execute a timestamp update operation corresponding to a particular segment execution time, the timestamp update operation being conducted without interaction with the operating system of the complex processing system.

20. The memory controller of claim 19, wherein the timestamp assist logic module comprises:

an elapsed time module;

an update address module; and a location value module.

21. The memory controller of claim 20, wherein the elapsed time module comprises a device for calculating and storing an elapsed time value corresponding to the time elapsed between initial segment execution and completion of segment execution, as indicated by access to the address register.

22. The memory controller of claim 20, wherein the elapsed time module comprises an elapsed time register having en updated elapsed time value stored therein.

23. The memory controller of claim 19, wherein the timestamp assist logic module is configured to generate an interrupt signal in response to the processor writing to the address register, an address of a memory location that has not been updated since the address was previously written to the address register.

* * * * *